(12) United States Patent
Wang et al.

(10) Patent No.: US 10,310,660 B2
(45) Date of Patent: *Jun. 4, 2019

(54) HOVER CONTROLLING DEVICE

(71) Applicants: Tsinghua University, Beijing (CN); HON HAI PRECISION INDUSTRY CO., LTD., New Taipei (TW)

(72) Inventors: Xin-He Wang, Beijing (CN); Dong-Qi Li, Beijing (CN); Jiang-Tao Wang, Beijing (CN); Wen-Yun Wu, Beijing (CN); Yu-Jun He, Beijing (CN); Peng Liu, Beijing (CN); Qing-Yu Zhao, Beijing (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 193 days.

This patent is subject to a terminal disclaimer.

(21) Appl. No.: 14/979,489

(22) Filed: Dec. 27, 2015

(65) Prior Publication Data

US 2016/0188095 A1  Jun. 30, 2016

(30) Foreign Application Priority Data

Dec. 31, 2014 (CN) .......................... 2014 1 0849989

(51) Int. Cl.
*G06F 3/041* (2006.01)
*G06F 3/047* (2006.01)

(52) U.S. Cl.
CPC ............ *G06F 3/0416* (2013.01); *G06F 3/047* (2013.01); *G06F 2203/04101* (2013.01)

(58) Field of Classification Search
CPC . G06F 2203/04106; G06F 2203/04108; G06F 3/0416; G06F 3/044; G06F 3/047; Y10S 977/75; Y10S 977/752
See application file for complete search history.

(56) References Cited

U.S. PATENT DOCUMENTS 8,502,786 B2   8/2013  Jiang et al.
8,614,693 B2  12/2013  King et al.
(Continued)

FOREIGN PATENT DOCUMENTS

CN         1381059       11/2002
CN     101937279 A        1/2011
(Continued)

*Primary Examiner* — Viet D Pham
(74) *Attorney, Agent, or Firm* — ScienBiziP, P.C.

(57) ABSTRACT

A hover controlling device includes a sensing unit and a hover control unit. The sensing unit includes a plurality of first electrostatic sensing elements, a plurality of first electrodes, a plurality of second electrostatic sensing elements, and a plurality of third electrodes located on a substrate. Each first electrostatic sensing element and each second electrostatic sensing element include a single walled carbon nanotube or a few-walled carbon nanotube. The resistances of the plurality of first electrostatic sensing elements and the plurality of second electrostatic sensing elements are changed in process of a sensed object with electrostatic near, but does not touch the plurality of first electrostatic sensing elements and the plurality of second electrostatic sensing elements. The hover control unit is electrically connected to the plurality of first electrostatic sensing elements and the plurality of second electrostatic sensing elements.

18 Claims, 7 Drawing Sheets

(56) References Cited

U.S. PATENT DOCUMENTS

| | | | |
|---|---|---|---|
| 9,323,398 B2 | 4/2016 | Bernstein et al. | |
| 2002/0183207 A1 | 12/2002 | Hjortstam et al. | |
| 2008/0048996 A1* | 2/2008 | Hu | G06F 3/044 345/174 |
| 2009/0153513 A1* | 6/2009 | Liu | G06F 3/044 345/173 |
| 2009/0167711 A1* | 7/2009 | Jiang | G06F 3/0412 345/173 |
| 2010/0328258 A1 | 12/2010 | Cheng et al. | |
| 2011/0304579 A1 | 12/2011 | Feng et al. | |
| 2012/0050180 A1 | 3/2012 | King et al. | |
| 2014/0013865 A1* | 1/2014 | White | G01L 1/14 73/862.626 |
| 2014/0144766 A1* | 5/2014 | Feng | H01H 1/027 200/600 |
| 2014/0145980 A1* | 5/2014 | Feng | G06F 3/044 345/173 |
| 2014/0282239 A1* | 9/2014 | Locker | G06F 3/0482 715/810 |
| 2014/0340590 A1* | 11/2014 | Shih | G06F 3/044 349/12 |

FOREIGN PATENT DOCUMENTS

| | | |
|---|---|---|
| CN | 102236439 A | 11/2011 |
| CN | 101859216 | 1/2012 |
| CN | 102483673 | 5/2012 |
| CN | 103168284 | 6/2013 |
| CN | 103235195 A | 8/2013 |
| TW | I416380 | 11/2013 |
| TW | M478871 | 5/2014 |
| WO | 2014009781 A1 | 1/2014 |

* cited by examiner

HOVER CONTROLLING DEVICE

CROSS-REFERENCE TO RELATED APPLICATIONS

This application claims all benefits accruing under 35 U.S.C. § 119 from China Patent Application No. 201410849989.3, filed on Dec. 31, 2014, in the China Intellectual Property Office. This application is related to commonly-assigned application entitled, "TOUCH AND HOVER SENSING DEVICE", concurrently filed Ser. No. 14/979,481; "TOUCH AND HOVER SENSING DEVICE", concurrently filed Ser. No. 14/979,485; "HOVER CONTROLLING DEVICE", concurrently filed Ser. No. 14/979,490. Disclosures of the above-identified applications are incorporated herein by reference.

FIELD

The present application relates to a hover controlling device.

BACKGROUND

Following the advancement in recent years of various electronic apparatuses, such as mobile phones, car navigation systems and the like, toward high performance and diversification, there has been continuous growth in the number of electronic apparatuses equipped with optically transparent touch panels at the front of their respective display devices (e.g., liquid crystal panels). A user of any such electronic apparatus operates it by pressing or touching the touch panel with a finger, a pen, stylus, or another like tool while visually observing the display device through the touch panel. Therefore, a demand exists for touch panels that provide superior visibility and reliable operation.

With the rapid development of electronic apparatuses, some touch panels need to also recognize a hover event, i.e., an object (hand or touch pen) near but not touching the touch panel, and the position of the hover event at the touch panel.

What is needed, therefore, is to provide a hover controlling device.

BRIEF DESCRIPTION OF THE DRAWINGS

Implementations of the present technology will now be described, by way of example only, with reference to the attached figures, wherein.

DETAILED DESCRIPTION

Figure 1:
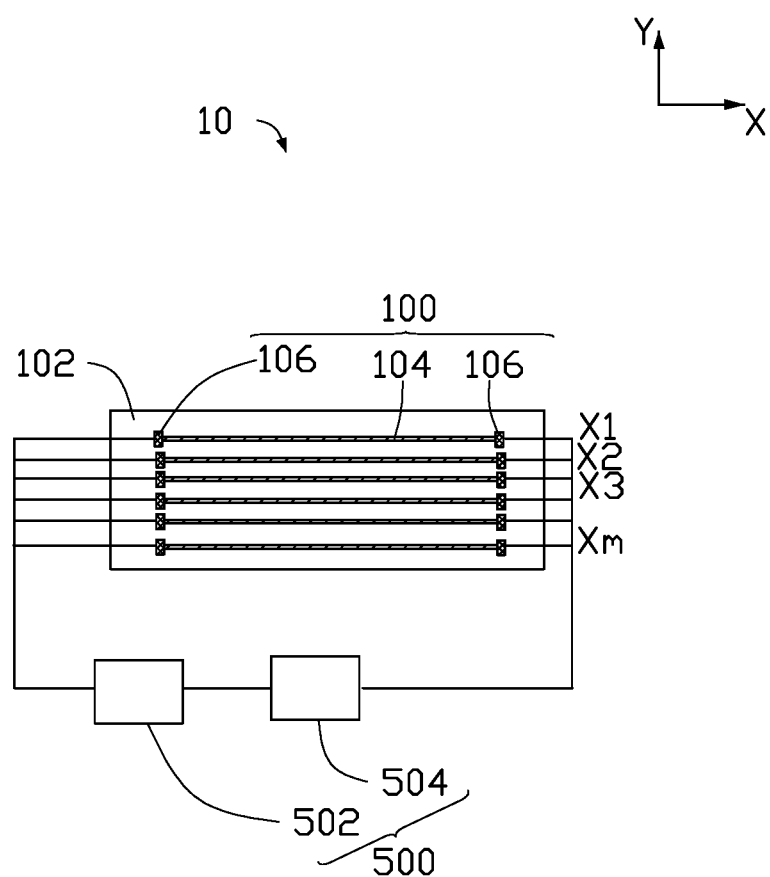
FIG. 1 is a schematic view of one embodiment of a hover controlling device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 2:
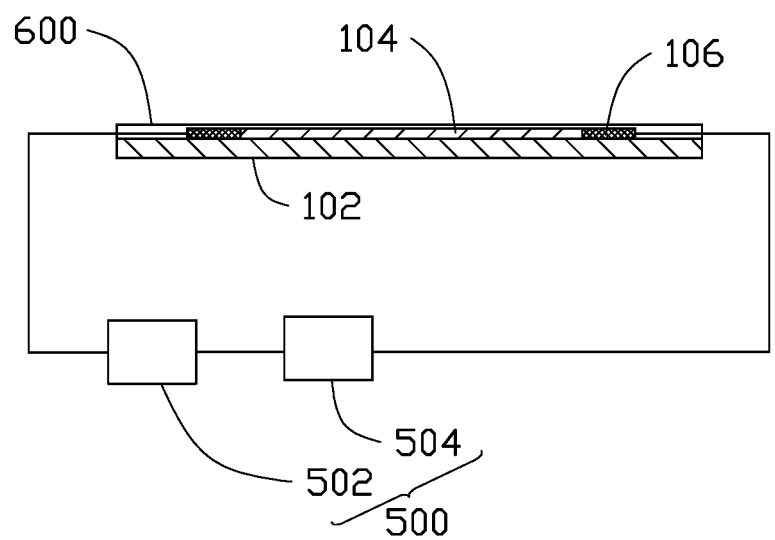
FIG. 2 is another schematic view of one embodiment of the hover controlling device of FIG. 1.

Referring to FIGS. 1 and 2, a hover controlling device 10 includes a sensing unit 100 and a hover control unit 500. The sensing unit 100 can be located on a surface of a substrate 102. The sensing unit 100 includes a plurality of first electrostatic sensing elements 104 and a plurality of first electrodes 106. The plurality of first electrostatic sensing elements 104 is parallel to each other and spaced from each other. Each first electrostatic sensing element 104 has a first end and a second end opposite to the first end. The first end is electrically connected to one first electrode 106, and the second end is electrically connected to another first electrode 106. The plurality of first electrodes 106 can be located on the surface of the substrate 102. The plurality of first electrostatic sensing elements 104 can be adhered on the surface of the substrate 102 by an insulating adhesive.

The hover control unit 500 includes a circuit control element 502 and a current detect element 504. The circuit control element 502 can be electrically connected to the current detect element 504 by the conductive wire. The hover control unit 500 can be electrically connected to the plurality of first electrostatic sensing elements 104 by conductive wire. A direct voltage can be applied to the plurality of first electrostatic sensing elements 104 by the circuit control element 502. The current detect element 504 can detect the currents of the plurality of first electrostatic sensing elements 104 and output current signals.

The substrate 102 can be flat or curved to support other elements. The substrate 102 can be insulating and transparent. The substrate 102 can be also opaque. The substrate 102 can be made of rigid materials such as glass, quartz, diamond, plastic or any other suitable material. The substrate 102 can also be made of flexible materials such as polycarbonate (PC), polymethyl methacrylate acrylic (PMMA), polyimide (PI), polyethylene terephthalate (PET), polyethylene (PE), polyether polysulfones (PES), polyvinyl polychloride (PVC), benzocyclobutenes (BCB), polyesters, or acrylic resin. A shape and size of the substrate 102 can be selected according to need. In one embodiment, a thickness of the substrate 102 is less than 1 millimeter. In one embodiment, the substrate 102 is a flat quartz plate, the area of the substrate 102 is 2 centimeters×2 centimeters, the thickness of the substrate 102 is 0.8 millimeters.

The plurality of first electrostatic sensing elements 104 can be one-dimensional semiconducting linear structure in nanoscale with single crystal structure. A diameter of the one-dimensional semiconducting linear structure in nanoscale can be less than 100 nanometers. The one-dimensional semiconducting linear structure in nanoscale can be a semiconducting linear structure with larger length diameter ratio. The length diameter ratio of the one-dimensional semiconducting linear structure is greater than 1000:1.

Each of the plurality of first electrostatic sensing elements 104 can be semiconducting graphene strips with a width of less than 10 nanometers, a thickness of less than 5 nanometers, and a length of great than 1 centimeter. Each of the plurality of first electrostatic sensing elements 104 can be one semiconducting silicon nanowire with a diameter of less than 5 nanometers, and a length of greater than 1 centimeter. Each of the plurality of first electrostatic sensing elements 104 can be one ultra long single walled carbon nanotube or few-walled carbon nanotube with a diameter of less than 5 nanometers, and a length of greater than 1 centimeter. The few-walled carbon nanotube is a carbon nanotube with wall of from about two layers to about six layers. In one embodiment, the few-walled carbon nanotube has two or three layers wall.

Figure 3:
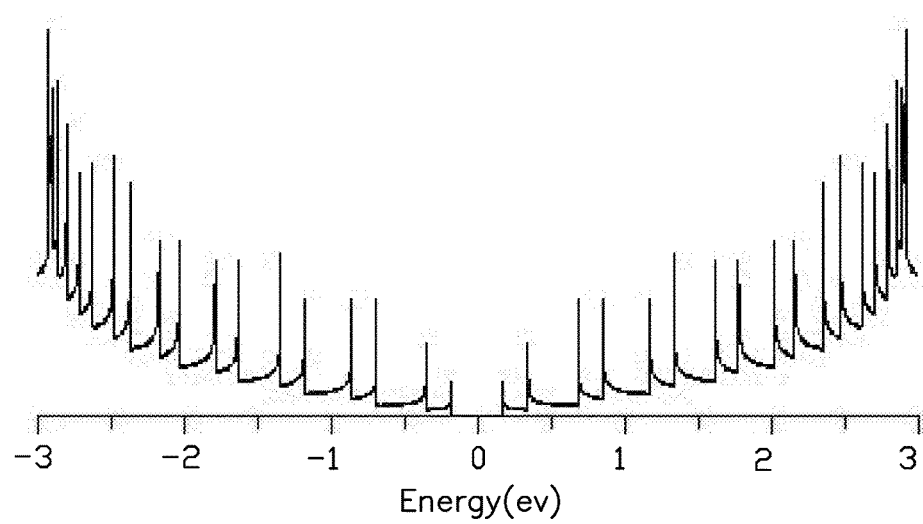
FIG. 3 is an electron density of state distribution curve of a carbon nanotube.

As shown in FIG. 3, the state density distribution curve of the carbon nanotube has a lot of singularities. The state density of the carbon nanotube takes great value at the point of the singularity. Distribution of singularities is relatively symmetrical to 0 eV place. In an ideal state without making any doping, the Fermi level locates on 0 eV place. The above properties are all one-dimensional semiconducting linear structure in nanoscale common characteristics. As previously mentioned, sensitive response to the electrostatic requires Fermi surface moving in the vicinity of the singularity of one-dimensional semiconducting linear structure in nanoscale. So that there is a need to make the Fermi level to raise or decrease to the neighborhood singularity nearest to 0 eV.

Figure 4:
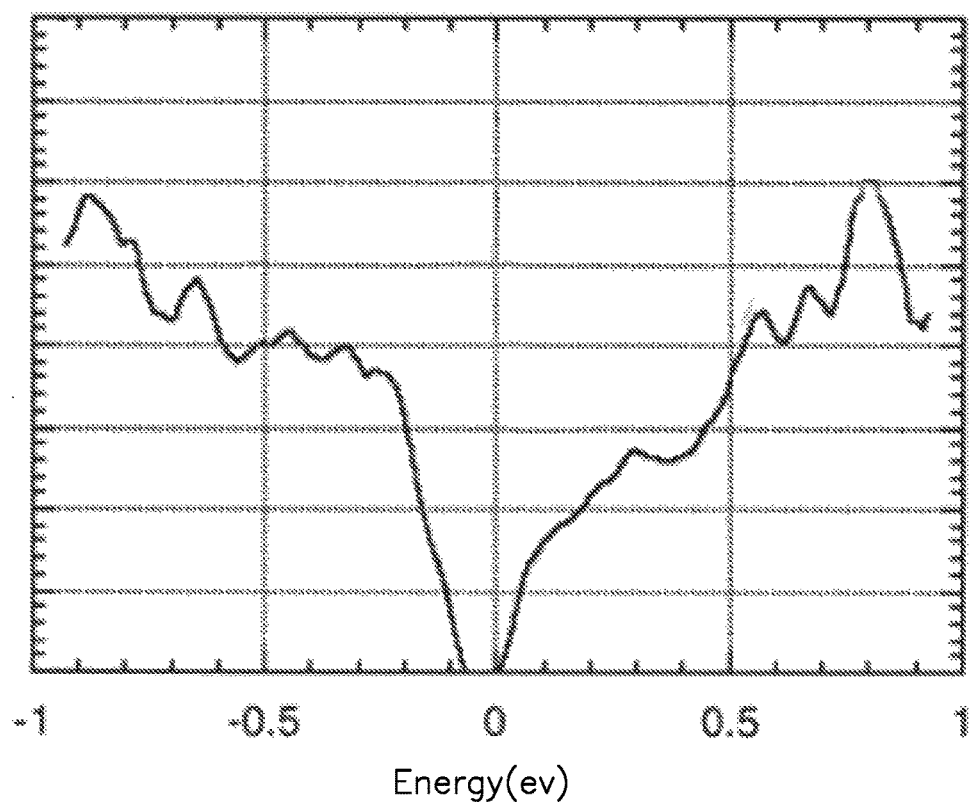
FIG. 4 is an electron density of state distribution curve of carbon nanotube under normal temperature measured by Scanning tunneling spectroscopy (STS).

Referring to FIG. 4, in practice, due to the thermal excitation, surface adsorption and interaction with the surrounding environment, the singularity of one-dimensional semiconducting linear structure in nanoscale will be broadened into a half-height peak with a width L. The peaks are always to be buried because the overlap of the peaks. But, the rising edge of peak singularity nearest 0 eV is always present. To make the one-dimensional semiconducting linear structure in nanoscale having electrostatic sensitive response, the Fermi surface needs to be fixed at a place with a distance to the singularity less than L/2. In practical applications, to obtain sensitive response to the electrostatic, through natural doping, doping and other artificial materials to make the distance between the Fermi surface and the singularity of the one-dimensional semiconducting linear structure in nanoscale within a range of 30 meV~300 meV.

Carbon nanotubes prepared sample exposed to the air, since the formation of oxygen adsorbed p-type doped, the distance from the Fermi surface to singular points in the state density falls within 30~300 meV, preferably 60 to fall within 100 meV. Therefore, thereby preparing natural carbon nanotubes have electrostatic sensitive response. Graphene strips, semiconducting nanowires (e.g. silicon nanowires) can adsorb oxygen to form a p-type doping. A doping can also be used to adjust distance between the Fermi surface and the singular point in the state density within a distance of 30~300 meV.

When the sensed object with static electricity nears the one-dimensional material semiconducting linear structure in nanoscale, the electric potential raise, so the Fermi level of the one-dimensional semiconducting linear structure in nanoscale would be modulated, the corresponding density of states will change, and the conductivity change. Therefore, when considering the sensitivity of the process, we need to focus on two things: first, modulation efficiency of the sensed object to the Fermi level of the one-dimensional semiconducting linear structure in nanoscale; second, the change rate of the density of states with the Fermi level moving of the one-dimensional semiconducting linear structure in nanoscale.

On the first point, it is strongly influenced by the substrate, the surface adsorption and other environmental factors. It is impossible to quantitatively determine the modulation efficiency of the sensed object to the Fermi level of the one-dimensional semiconducting linear structure in nanoscale theoretically. The modulation efficiency of the sensed object to the Fermi level of the one-dimensional semiconducting linear structure can only be obtained from experimental measurements. For example, the modulation efficiency of the carbon nanotube located on a silica substrate is measured, and the modulation efficiency of the carbon nanotube located on a silica substrate is $4\times10^{-5}$. The second point is a requirement about the one-dimensional semiconducting linear structure in nanoscale, which requires the absolute value of $(d\sigma/dE_F)/(\sigma/E_F)$ greater than $10^{-1}$, or greater than $10^{-3}$ ($\sigma$ is the conductivity of the one-dimensional semiconducting linear structure in nanoscale, $E_F$ is the Fermi surface location of the one-dimensional semiconducting linear structure in nanoscale). In this condition, when the sensed objection is close to the one-dimensional semiconducting linear structure in nanoscale, the conductivity change is not less than 10% in favor to signal detection.

When using carbon nanotubes with the diameter distribution of 2-3 nm (carbon nanotubes are located on a silica substrate), the conductivity of the carbon nanotubes reduce by half ($d\sigma/\sigma\sim\frac{1}{2}$), when a sensed object with electrostatic 1000V is close to the carbon nanotubes at a place 0.5 meter far from the carbon nanotubes. The modulation efficiency is measured as $4\times10^{-5}$, $dE_F\sim40$ meV $E_F$ of the carbon nanotubes is $E_F\sim150$ meV. Thus, the absolute value of $(d\sigma/dE_F)/(\sigma/E_F)$ of the carbon nanotubes is about 2. The graphene strips, the semi-conductive nano-wires can satisfy the requirement of $(d\sigma/dE_F)/(\sigma/E_F)$ greater than $10^{-1}$, or greater than $10^{-3}$. If it is just to achieve a qualitative sense the presence or absence of the sensed object with static electricity, $(d\sigma/dE_F)/(\sigma/E_F)$ of one-dimensional semiconducting linear structure in nanoscale is greater than $10^{-3}$. If it is to quantify the amount of sensing electrostatic or sense the position of the sensed object with static electricity, $(d\sigma/dE_F)/(\sigma/E_F)$ of one-dimensional semiconducting linear structure in nanoscale is greater than $10^{-1}$.

One single walled carbon nanotube or a single few-walled carbon nanotube is quasi-one-dimensional structure. The smaller the diameter of the quasi-one-dimensional structure is, the density of state (DOS) of the quasi-one-dimensional structure is greater. The greater the DOS of the quasi-one-dimensional structure is, the shielding effect of the quasi-one-dimensional structure is smaller. And accordingly, the smaller the shielding effect of the quasi-one-dimensional structure is, the sensibility of sensing static electricity of the quasi-one-dimensional structure is greater. Therefore, the smaller the diameter of the single walled carbon nanotube or few-walled carbon nanotube is, the sensibility of sensing position coordinate of the sensed object is greater.

The diameter of the single walled carbon nanotube or few-walled carbon nanotube can be less than about 5 nanometers. In one embodiment, the diameter of the single walled carbon nanotube or few-walled carbon nanotube is in a range from about 2 nanometers to about 5 nanometers. The ultra long single walled carbon nanotube or few-walled carbon nanotube can have a length greater than 1 centimeter. In one embodiment, the plurality of first electrostatic sensing elements 104 are single walled carbon nanotubes or few-walled carbon nanotubes with diameter of about 2 nanometers and length of about 2 centimeters. The single walled carbon nanotubes or few-walled carbon nanotubes can be made by a known method of adopting a "kite-mechanism". An example of the "kite-mechanism" is disclosed in Publication No. US20130252405A1.

A first direction X and a second direction Y, perpendicular to the first direction X, are defined on the surface of the substrate 102. The plurality of first electrostatic sensing elements 104 extends along the first direction X and spaced from each other. A distance between two adjacent first electrostatic sensing elements 104 can be selected according to resolution ratio. The distance between two adjacent first electrostatic sensing elements 104 can be in a range from about 2 millimeters to about 2 centimeters. The plurality of first electrostatic sensing elements 104 are labeled by $X_m$ according to an arranging order of the plurality of first electrostatic sensing elements 104, such as $X_1, X_2, X_3, \ldots, Xm$. The m is a positive integer.

The plurality of first electrodes 106 can be made of a conductive material, such as metal, conductive polymer, conductive adhesive, metallic carbon nanotubes, or indium tin oxide (ITO). The plurality of first electrodes 106 can be made by a method such as screen printing, chemical vapor deposition, or magnetron sputtering. In one embodiment, the material of the plurality of first electrodes 106 is ITO.

The hover controlling device 10 further includes a protecting layer 600 covering the plurality of first electrostatic sensing elements 104 and the plurality of electrodes 106. The protecting layer 600 is used to protect the sensing unit 100, as shown in FIG. 2. The materials of the protecting layer 600 is insulating and transparent, such as polyethylene (PE), polycarbonate (PC), polyethylene terephthalate (PET), polymethyl methacrylate acrylic (PMMA), or thin glass.

When a sensed object, such as user's finger or touch pen near but does not touch the plurality of first electrostatic sensing elements 104 of the sensing unit 100, resistances of the plurality of first electrostatic sensing elements 104 will change. The resistances are changed because of influence of band gap structure in the single walled carbon nanotube or few-walled carbon nanotube. The resistance changes make the currents of the plurality of first electrostatic sensing elements 104 to change.

A current changed value of individual first electrostatic sensing element 104 is related to a distance between the sensed object and the individual first electrostatic sensing element 104. The smaller the distance between the sensed object and the individual first electrostatic sensing element 104 is, the current changed value of the individual first electrostatic sensing element 104 is greater.

The current changed values of the plurality of first electrostatic sensing elements 104 are different from each other, because the distances between the sensed object and each of the plurality of first electrostatic sensing elements 104 are different. The current changed value of the first electrostatic sensing element 104 closest to the sensed object is the largest. The current changed values of the plurality of first electrostatic sensing elements 104 can be detected by the current detect element 504 and outputted as output signals. Therefore, the distribution of the current changes of the plurality of first electrostatic sensing elements 104 is obtained.

In one embodiment, the hover controlling device 10 can detect a position coordinate or movement of the sensed object in the second direction Y.

The method for detecting the position coordinate of the sensed object in the second direction Y is explained in detail. The direct voltages are simultaneously applied to each first electrostatic sensing element 104 by the circuit control element 502, when the sensed object nears but does not touch the plurality of first electrostatic sensing elements 104, currents of the plurality of first electrostatic sensing elements 104 will change because of influence of band gap structure in the single walled carbon nanotube or the few-walled carbon nanotube. The current detect element 504 can detect the current changes of the plurality of first electrostatic sensing elements 104 along the second direction Y, because the plurality of first electrostatic sensing elements 104 extends along the first direction X. The current change values of the plurality of first electrostatic sensing elements 104 are defined as IXm. Therefore, m current change values can be obtained, such as $IX_1, IX_2, IX_3, \ldots, IXm$.

The current changed value of the first electrostatic sensing element 104 closest to the sensed object is the largest. The first electrostatic sensing element 104 closest to the sensed object can be known according to the largest current change value of first electrostatic sensing element 104. Thus, the distance between the sensed object and the first electrostatic sensing element 104 closest to the sensed object can be known, and accordingly, the position of the sensed object in the second direction Y can be known, and Y coordinate of the sensed object can be known. An electrical device including the hover controlling device 10 can be controlled by the position coordinates of the sensed object, after determining the position coordinates of the sensed object.

The method for detecting movement of the sensed object in the second direction Y is explained in detail. When the sensed object nears but does not touch the hover controlling device 10, at a moment (t), the position coordinates of the sensed object in the second direction Y is defined as D1. At a moment (t+1), the position coordinates of the sensed object in the second direction Y is defined as D2. The movement of the sensed object from D1 to D2 can be obtained by detecting the D1 and D2 by the hover controlling device 10. An electrical device including the hover controlling device 10 can be controlled by movement of the sensed object, such as moving of touch pen or gesture. The electrical device can be a switch or display.

Figure 5:
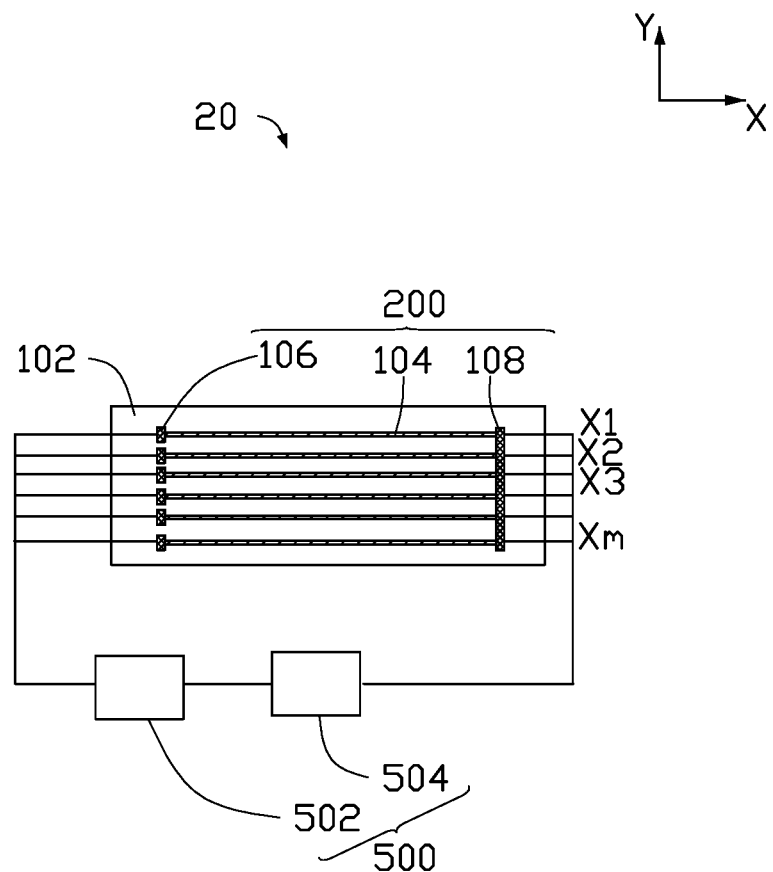
FIG. 5 is a schematic view of another embodiment of a hover controlling device.

Referring to FIG. 5, an embodiment of a hover controlling device 20 is shown where the plurality of first electrostatic sensing elements 104 have a first end and a second end opposite to the first end, the first end of each first electrostatic sensing element 104 is electrically connected to one first electrode 106, and the second ends of all first electrostatic sensing element 104 is electrically connected together to one second electrode 108. The material of the plurality of first electrodes 106 is the same as the material of the second electrode 108.

Figure 6:
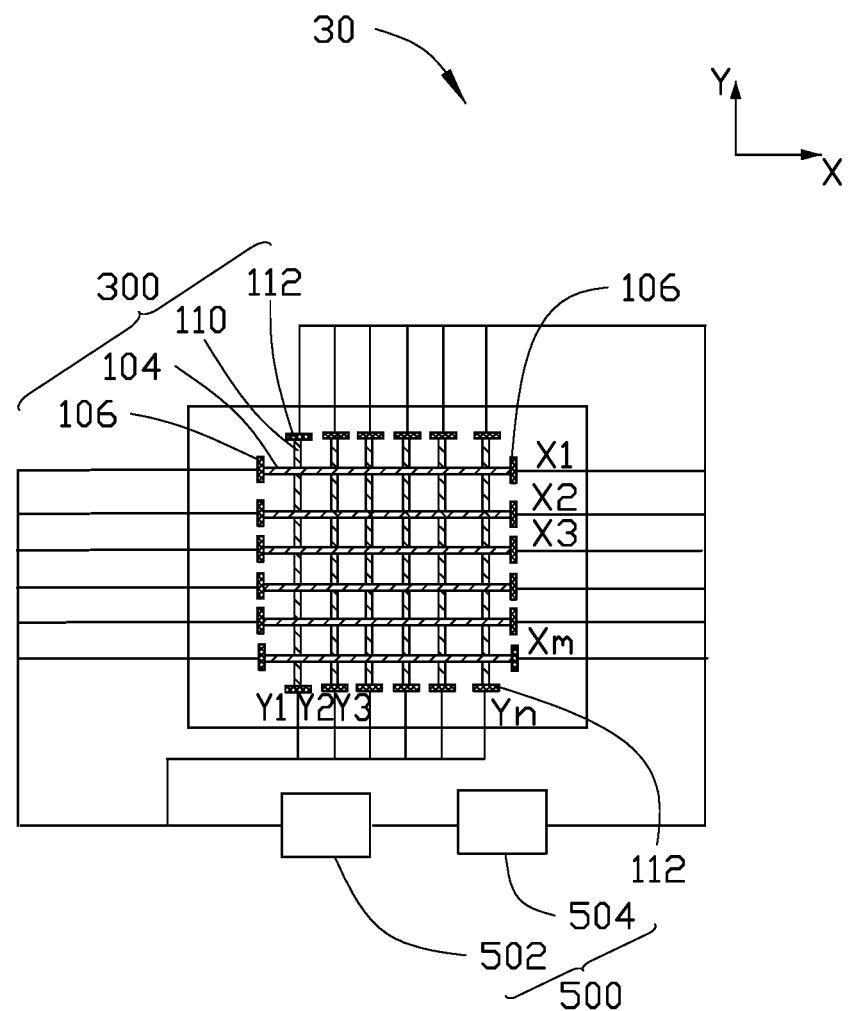
FIG. 6 is a schematic view of yet another embodiment of a hover controlling device.

Referring to FIG. 6, an embodiment of a hover controlling device 30 is shown where the hover controlling device 30 includes a sensing unit 300 located on the substrate 102 and a hover control unit 500 including the circuit control element 502 and the current detect element 504. The sensing unit 300 includes a plurality of first electrostatic sensing elements 104, a plurality of first electrodes 106, a plurality of second electrostatic sensing elements 110, and a plurality of third electrodes 112 located on the substrate 102.

A first direction X and a second direction Y, perpendicular to the first direction X, are defined on the surface of the substrate 102. The plurality of first electrostatic sensing elements 104 extends along the first direction X. The plurality of first electrostatic sensing elements 104 is spaced from each other and parallel to each other. The plurality of second electrostatic sensing elements 110 extends along the second direction Y. The plurality of second electrostatic sensing elements 110 is spaced from each other and parallel to each other. The plurality of first electrostatic sensing elements 104 and the plurality of second electrostatic sensing elements 110 are intersected with each other, to form a plurality of grids. Two opposite ends of each of the plurality of first electrostatic sensing elements 104 are separately electrically connected to one first electrode 106. Two opposite ends of each of the plurality of second electrostatic sensing elements 110 are separately electrically connected to one third electrode 112.

The plurality of first electrostatic sensing elements 104 and the plurality of second electrostatic sensing elements 110 are electrically insulated from each other. The methods for electrically insulating the plurality of first electrostatic sensing elements 104 and the plurality of second electrostatic sensing elements 110 can be selected according to need.

An insulating adhesive layer can be located on whole surface of the plurality of first electrostatic sensing elements 104, and the plurality of second electrostatic sensing elements 110 can be located on the insulating adhesive layer. The insulating adhesive layer can only be located on portions of the plurality of first electrostatic sensing elements 104 intersected with the plurality of second electrostatic sensing elements 110. In one embodiment, the insulating adhesive layer is only located on the portions of the plurality of first electrostatic sensing elements 104 intersected with the plurality of second electrostatic sensing elements 110.

The plurality of first electrostatic sensing elements 104 are labeled by $X_m$ according to an arranging order of the plurality of first electrostatic sensing elements 104, such as $X_1, X_2, X_3, \ldots, Xm$. The m is a positive integer. The hover control unit 500 can be electrically connected to the plurality of first electrostatic sensing elements 104 by conductive wire. A direct voltage can be applied to the plurality of first electrostatic sensing elements 104 by the circuit control element 502. The current detect element 504 can detect the currents of the plurality of first electrostatic sensing elements 104 and output current signals.

The plurality of second electrostatic sensing elements 110 are labeled by according to an arranging order of the plurality of second electrostatic sensing elements 110, such as $Y_1, Y_2, Y_3, \ldots, Ym$. The m is a positive integer. The hover control unit 500 can be electrically connected to the plurality of second electrostatic sensing elements 110 by conductive wire. A direct voltage can be applied to the plurality of second electrostatic sensing elements 110 by the circuit control element 502. The current detect element 504 can detect the currents of the plurality of second electrostatic sensing elements 110 and output current signals.

The material of the plurality of second electrostatic sensing elements 110 is the same as the material of the plurality of first electrostatic sensing elements 104. In one embodiment, the materials of the plurality of second electrostatic sensing elements 110 and the plurality of first electrostatic sensing elements 104 are one single walled carbon nanotube or few-walled carbon nanotube. In one embodiment, the diameter of the single walled carbon nanotube or the few-walled carbon nanotube is less than 5 nanometers, and the length of the single walled carbon nanotube or the few-walled carbon nanotube is greater than 1 centimeter. In one embodiment, the diameter of the single walled carbon nanotube or the few-walled carbon nanotube is 2 nanometers, and the length of the single walled carbon nanotube or the few-walled carbon nanotube is 2 centimeters. The material of the plurality of first electrodes 106 are the same as the material of the plurality of third electrodes 112.

In one embodiment, the hover controlling device 30 can detect a position coordinate or movement of the sensed object in the second direction Y.

The method for detecting the position coordinate of the sensed object in the second direction Y is explained in detail. The direct voltages are simultaneously applied to each first electrostatic sensing element 104 and each second electrostatic sensing element 110 by the circuit control element 502, when the sensed object nears the surface of the substrate 102, currents of the plurality of first electrostatic sensing elements 104 and the plurality of second electrostatic sensing elements 110 will change because of influence of band gap structure in the single walled carbon nanotube or the few-walled carbon nanotube. The current detect element 504 can detect the current changes of the plurality of first electrostatic sensing elements 104 and the plurality of second electrostatic sensing elements 110 along the first direction X and the second direction Y.

The current change values of the plurality of first electrostatic sensing elements 104 are defined as IXm. Therefore, m current change values can be obtained, such as $IX_1, IX_2, IX_3, \ldots, IXm$. The current change values of the plurality of second electrostatic sensing elements 110 are defined as IYn. Therefore, n current change values can be obtained, such as $IY_1, IY_2, IY_3, \ldots, IYm$.

The current changed value of the first electrostatic sensing element 104 closest to the sensed object is the largest. The first electrostatic sensing element 104 closest to the sensed object can be known according to the largest current change value of first electrostatic sensing element 104. Thus, the distance between the sensed object and the first electrostatic sensing element 104 closest to the sensed object can be known, and accordingly, the position of the sensed object in the second direction Y can be known, and Y coordinate of the sensed object can be known.

The current changed value of the second electrostatic sensing element 110 closest to the sensed object is the largest. The second electrostatic sensing element 110 closest to the sensed object can be known according to the largest current change value of second electrostatic sensing element 110. Thus, the distance between the sensed object and the second electrostatic sensing element 110 closest to the sensed object can be known, and accordingly, the position of the sensed object in the second direction X can be known, and X coordinate of the sensed object can be known. The position of the sensed object can be obtained according to Y coordinate and X coordinate of the sensed object. When a distance between the sensed object and the surface of the hover controlling device 30 is in a range from about 0.5 centimeters to about 1 centimeter, the hover controlling device 30 can sense the position coordinate of the sensed object.

The method for detecting movement of the sensed object in a plane formed by the first direction X and the second direction Y is explained in detail. When the sensed object nears but does not touch the hover controlling device 30, at a moment (t), the position coordinates of the sensed object is defined as D3. At a moment (t+1), the position coordinates of the sensed object is defined as D4. The movement of the sensed object from D3 to D4 can be obtained by detecting the D3 and D4 by the hover controlling device 30. An electrical device including the hover controlling device 30 can be controlled by movement of the sensed object, such as moving of touch pen or gesture. Multi-hover control can be achieved by adjusting driving mode and computational method.

Figure 7:
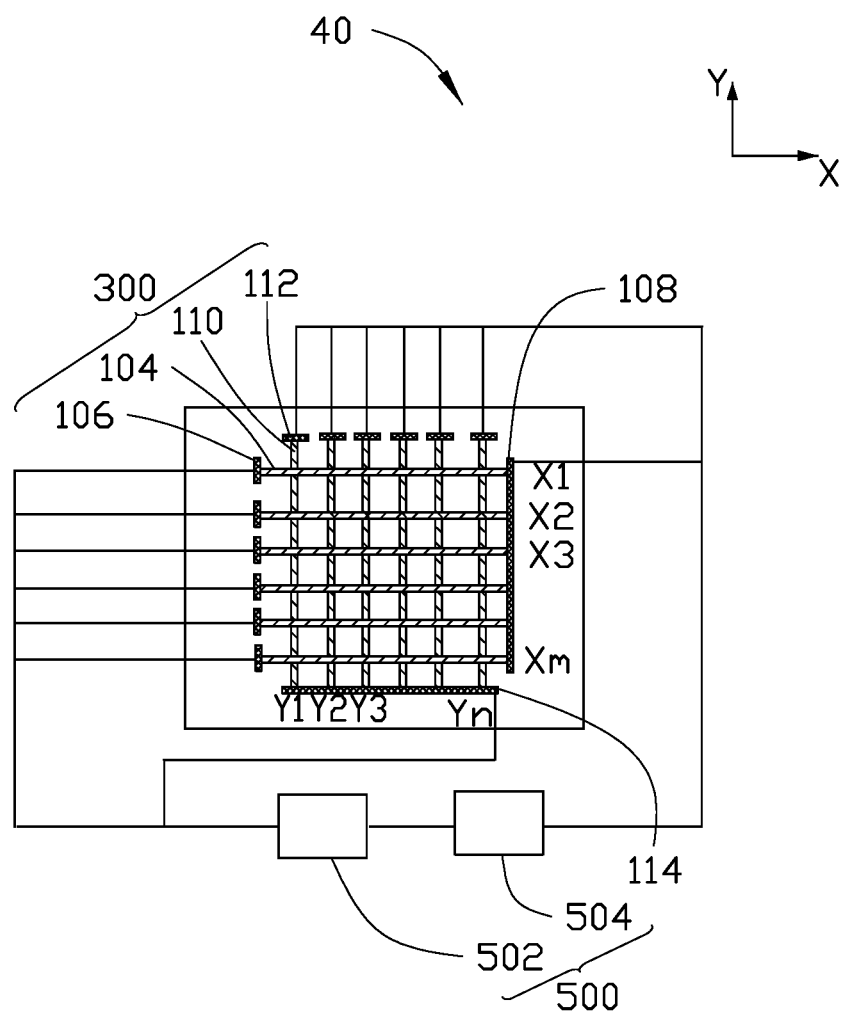
FIG. 7 is a schematic view of yet another embodiment of a hover controlling device.

Referring to FIG. 7, an embodiment of a hover controlling device 40 is shown where the plurality of first electrostatic sensing elements 104 have a first end and a second end opposite to the first end. The first end of each first electrostatic sensing element 104 is electrically connected to one first electrode 106, and the second ends of all first electrostatic sensing element 104 is electrically connected together to one second electrode 108. The plurality of second electrostatic sensing elements 110 have a third end and a forth end opposite to the third end. The third end of each second electrostatic sensing element 110 is electrically connected to one third electrode 112, and the forth ends of all second electrostatic sensing element 110 is electrically connected together to one forth electrode 114. The material of the plurality of first electrodes 106 is the same as the material of the forth electrode 108.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

Additionally, it is also to be understood that the above description and the claims drawn to a method may include some indication in reference to certain steps. However, the indication used is only to be viewed for identification purposes and not as a suggestion as to an order for the steps.

What is claimed is:

1. A hover controlling device, comprising:
   a sensing unit comprising:
   a plurality of first electrostatic sensing elements;
   a plurality of first electrodes being metal electrodes;
   a plurality of second electrostatic sensing elements electrically insulated from the plurality of first electrostatic sensing elements; and
   a plurality of third electrodes being metal electrodes;
   wherein the plurality of first electrostatic sensing elements is spaced from each other along a first direction, and the plurality of second electrostatic sensing elements is spaced from each other along a second direction; each of the plurality of first electrostatic sensing elements and each of the plurality of second electrostatic sensing elements is only one single walled carbon nanotube or only one few-walled carbon nanotube with two walls to six walls, the one single walled carbon nanotube or the one few-walled carbon nanotube is used for sensing static electricity, and a resistance of the single walled carbon nanotube or the few-walled carbon nanotube is variable; each of the plurality of first electrostatic sensing elements has a first end and a second end opposite to the first end, one of the plurality of first electrodes is in direct contact with the first end, and another one of the plurality of first electrodes is in direct contact with the second end; and each of the plurality of second electrostatic sensing elements has a third end and a fourth end opposite to the third end, one of the plurality of third electrodes is in direct contact with the third end, and another one of the plurality of third electrodes is in direct contact with the fourth end; and
   a hover control unit electrically connected to the plurality of first electrostatic sensing elements and the plurality of second electrostatic sensing elements.

2. The hover controlling device of claim 1, wherein the hover control unit determines a position coordinate of the sensed object by sensing a distribution of current values of the plurality of first electrostatic sensing elements and the plurality of second electrostatic sensing elements.

3. The hover controlling device of claim 1, wherein the single walled carbon nanotube or the few-walled carbon nanotube has a diameter of less than 5 nanometers, and a length of greater than 1 centimeter.

4. The hover controlling device of claim 1, wherein the second direction is perpendicular to the first direction.

5. The hover controlling device of claim 1, wherein the plurality of first electrostatic sensing elements is parallel to each other, and the plurality of second electrostatic sensing elements is parallel to each other.

6. The hover controlling device of claim 1, wherein a distance between the sensed object and the hover controlling device is in a range from about 0.5 centimeters to about 1 centimeter.

7. The hover controlling device of claim 1, wherein an insulating adhesive layer is located on portions of the plurality of first electrostatic sensing elements intersected with the plurality of second electrostatic sensing elements.

8. The hover controlling device of claim 1, wherein the hover control unit comprises a circuit control element and a current detect element.

9. The hover controlling device of claim 8, wherein a direct voltage is applied to the plurality of first electrostatic sensing elements and the plurality of second electrostatic sensing elements by the circuit control element, and the current detect element detect currents of the plurality of first electrostatic sensing elements and the plurality of second electrostatic sensing elements.

10. The hover controlling device of claim 1, wherein the resistance of the single walled carbon nanotube or the resistance of the few-walled carbon nanotube changes when a sensed object with static electricity is close to but does not touch the hover controlling device.

11. A hover controlling device, comprising:
    a sensing unit comprising:
    a plurality of first electrostatic sensing elements;
    a plurality of first electrodes;
    a plurality of second electrostatic sensing elements electrically insulated from the plurality of first electrostatic sensing elements; and
    a plurality of third electrodes;

wherein the plurality of first electrostatic sensing elements is spaced from each other along a first direction, and the plurality of second electrostatic sensing elements is spaced from each other along a second direction perpendicular to the first direction; each of the plurality of first electrostatic sensing elements and each of the plurality of second electrostatic sensing elements comprise a single walled carbon nanotube or a few-walled carbon nanotube used for sensing static electricity, and a resistance of the single walled carbon nanotube or the few-walled carbon nanotube is variable; each of the plurality of first electrostatic sensing elements has a first end and a second end opposite to the first end, one of the plurality of first electrodes is in direct contact with the first end, and another one of the plurality of first electrodes is in direct contact with the second end; and each of the plurality of second electrostatic sensing elements has a third end and a fourth end opposite to the third end, one of the plurality of third electrodes is in direct contact with the third end, and another one of the plurality of third electrodes is in direct contact with the fourth end; and a hover control unit comprising a circuit control element and a current detect element coupled to the plurality of first electrostatic sensing elements and the plurality of second electrostatic sensing elements.

12. The hover controlling device of claim 11, wherein the number of walls of the few-walled carbon nanotube ranges from two to six.

13. The hover controlling device of claim 11, wherein the single walled carbon nanotube or the few-walled carbon nanotube has a diameter of less than 5 nanometers, and a length of greater than 1 centimeter.

14. The hover controlling device of claim 11, wherein the plurality of first electrostatic sensing elements is parallel to each other, and the plurality of second electrostatic sensing elements is parallel to each other.

15. The hover controlling device of claim 11, wherein a distance between the sensed object and the hover controlling device is in a range from about 0.5 centimeters to about 1 centimeter.

16. The hover controlling device of claim 11, wherein an insulating adhesive layer is located on portions of the plurality of first electrostatic sensing elements intersected with the plurality of second electrostatic sensing elements.

17. The hover controlling device of claim 11, wherein a diameter of the single walled carbon nanotube or the few-walled carbon nanotube is in a range from about 2 nanometers to about 5 nanometers.

18. The hover controlling device of claim 11, wherein the resistance of the single walled carbon nanotube or the resistance of the few-walled carbon nanotube changes when a sensed object with static electricity is close to but does not touch the hover controlling device.

* * * * *